United States Patent [19]

Lindig

[11] Patent Number: 4,475,082
[45] Date of Patent: Oct. 2, 1984

[54] ANALOG DISPLAY DEVICE, PARTICULARLY A TACHOMETER

[75] Inventor: Christian Lindig, Kelkheim, Fed. Rep. of Germany

[73] Assignee: VDO Adolf Schindling AG, Frankfurt am Main, Fed. Rep. of Germany

[21] Appl. No.: 424,671

[22] Filed: Sep. 27, 1982

[30] Foreign Application Priority Data

Nov. 19, 1981 [DE] Fed. Rep. of Germany ....... 3145780

[51] Int. Cl.³ .......................... G01P 3/42; G05B 19/40
[52] U.S. Cl. ..................................... 324/160; 318/696
[58] Field of Search ................ 318/696; 324/169, 166, 324/160, 172

[56] References Cited

U.S. PATENT DOCUMENTS 4,314,146 2/1982 Berney ............................ 318/696 X

OTHER PUBLICATIONS

Bianculli: "Stepper Motors"–IEEE Spectrum–Dec. 1970–pp. 25–29 (U.S. Cl 318/696).

Primary Examiner—Stanley T. Krawczewicz
Assistant Examiner—Jose M. Solis
Attorney, Agent, or Firm—Martin A. Farber

[57] ABSTRACT

In an analog display device, a pointer (1) can be reset by a stepping motor (2) which receives a constant number of pulses upon a reset command. In this way, starting from any position, the pointer is certain to reach the stop which corresponds to its zero position. In order in this connection to keep the mechanical force on the stop (6) and the transmission elements (3 and 4) between the pointer and the stepping motor small, the pulses for the resetting are produced initially with a relatively low pulse frequency and then with a higher pulse frequency. As a result, the stepping motor starts up reliably with a relatively high driving torque but gives off only a smaller driving torque when the stop in the zero position is reached.

1 Claim, 1 Drawing Figure

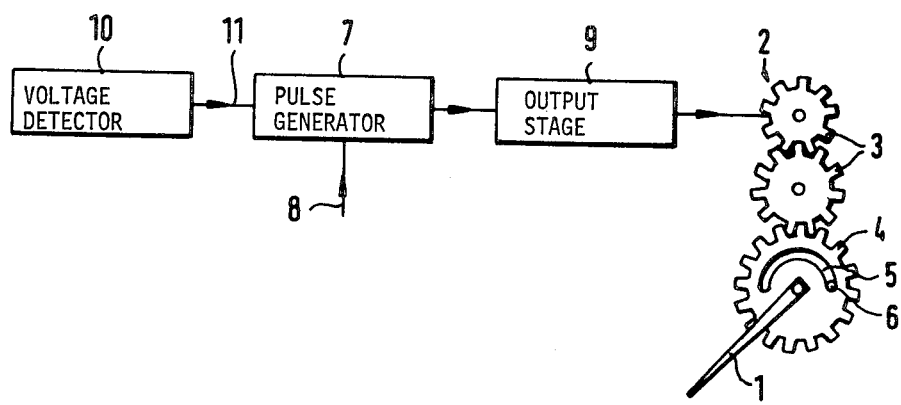

ANALOG DISPLAY DEVICE, PARTICULARLY A TACHOMETER

The present invention relates to an analog display device, particularly a tachometer, which has a pointer which is displaceable by a reversible stepping motor and can be reset against a stop by the stepping motor and also has a pulse generator which is controlled by a reset command and upon each reset command gives off a constant number of pulses to the stepping motor, possibly via a stepping-motor control circuit.

The tachometer referred to here is a so-called electronic tachometer in which a pulse frequency which is proportional to the speed of the vehicle is utilized in order to displace a pointer or tachometer needle by means of a stepping motor. The analog display device of the above type is not limited, however, to electronic tachometers but refers, in general, to a display device for variables which are to be represented in analog form.

In one known analog display device of the aforementioned type, a pointer is deflected by a reversible stepping motor via a transmission. A gear wheel of the transmission, on the shaft of which wheel the pointer is mounted, has an approximately semi-circular slot into which a stop pin extends. This stop pin limits the deflection of the pointer in the zero position and in the full position. The stepping motor is fed, via a stepping-motor control circuit, by a pulse generator which has a priming input. The pulse generator also feeds a reversible counter whose outputs are connected with a comparison circuit. The comparison circuit is furthermore connected with measured-value inputs in which signals corresponding to the measured value are fed in the same digital form as that in which the counter reading of the reversible counter is given off. Outputs of the comparison circuit are connected, on the one hand, via an AND member to a forward-backward control input of the reversible counter and a forward-backward control of the stepping-motor circuit and, on the other hand, via a second AND member, to the priming input of the pulse generator. Two further inputs of the said first and second AND members are controlled by the output of a flip-flop stage which has a reset input to receive a reset signal. The reset signal together with the flip-flop stage creates a reset command for the pulse generator. Upon the occurrence of a reset signal the reversible counter is set back to zero and the flip-flop stage brought into a position which gives off a reset command to the priming input of the pulse generator. The pulse generator then supplies pulses via the stepping-motor control circuit to both the stepping motor and the reversible counter. As a result, the reversible counter counts backwards and the stepping motor resets the pointer step by step. This process continues until the counting capacity of the reversible counter is reached, i.e. the same number of pulses is always given off to the stepping motor for the resetting. During this process the slot in the gear wheel which is connected with the pointer comes positively, in the zero position of the pointer, into engagement with the stop pin, as a result of which the pointer is stopped in the zero position. In this position the pointer and the reversible counter are synchronized with each other. The reset process can take place each time the analog display device is connected or with the aid of a detector (Federal Republic of Germany OS No. 29 46 328).

This analog display device has the disadvantage that the stop in the zero position is acted on, via the transmission, by a considerable torque of the stepping motor when the pointer reset not from its full deflection but from a lower value. In addition to this, there is the moment of inertia of the motor plus the transmission, which increases the thrust exerted on the stop and the transmission, so that, in view of the force exerted by the normal drive torque of the motor, the resetting must take place with limited speed if the transmission is not constructed with properties of high mechanical strength and thus with a greater moment of inertia.

The present invention therefore includes the object of so further developing an analog display device of the aforementioned type with resetting of the stepping motor with a constant number of pulses that the force exerted on the mechanical parts of the display device, particularly the stop and the transmission, is relatively slight and nevertheless the resetting takes place rapidly and reliably.

This object is achieved in the manner that the controlled pulse generator (7) is adapted to give off said constant number of pulses initially with a pulse frequency which is below a start-stop frequency of the stepping motor (2) and thereupon with a pulse frequency which is above said start-stop frequency.

Due to the fact that at the beginning of the reset phase the stepping motor is first of all acted on by relatively low-frequency pulses whose frequency is below the start-stop frequency of the stepping motor, the stepping motor starts up reliably and in synchronism with the pulses. Only then is the pulse frequency increased, namely to values above the start-stop frequency. In this way, not only is the resetting accelerated but, as a result of the customary characteristic of the stepping motor, the drive torque decreases with an increase in the frequency. This has the desired consequence that the drive torque is then relatively slight when the stop is reached at the zero position of the pointer. In this analog-display device, therefore, the mechanical parts can be made of relatively low weight. Despite the accelerated resetting, the synchronization between position of pointer and number of pulses is retained, i.e. the pointer is reliably reset even from the position of full deflection.

One particularly inexpensive embodiment of the analog display device with controlled pulse generator consists in developing the pulse generator (7) as a ramp generator, which increases the pulse frequency from below the start-stop frequency up to the maximum operating frequency of the stepping motor. Due to this ramp generator a particularly reliable synchronization of the movement of the stepping motor with the feeding pulses is also obtained. When this resetting is used for a tachometer which is to be reset upon the turning off of the ignition or the disappearance of the battery voltage, the pulse generator (7) can be controlled by a voltage detector (10). The analog display device can, after the turning off of the normal battery voltage, be fed by another connection to the battery or by an auxiliary battery.

The analog display device with a gear wheel which drives the pointer and is connected with the stepping motor is, preferably, developed with respect to its mechanical parts in the manner that the gear wheel has a slot which is proportional to the end stop of the pointer and, together with a fixed stop pin, forms two end stops.

Since, in the case of these stops, the fixed stop pin does not come into direct contact with the pointer it is particularly suitable for resetting with a number of pulses which is greater than necessary in order to reach the stop in zero position. The slot in the gear wheel can take up the momentum and forces upon the striking against the stop pin better than the pointer can directly.

A preferred embodiment of the invention will be described below with reference to the drawing, in which the electronic part for the resetting of the analog display device is shown in the form of a block diagram.

The drawing shows a pointer 1 of an electronic tachometer which is driven by a reversible stepping motor. The stepping motor 2 is connected via a transmission 3 with a gear wheel 4 which is coupled directly to the pointer and is turnable about the same axis. The gear wheel 4 has a slot 5 which is proportional to the end deflection of the pointer. A fixed stop pin 6 extends through the slot, said pin, in the position of rotation of the gear wheel 4 shown in the drawing, forming the end stop in the zero position and, at the opposite end of the slot, the stop for full deflection.

For the display of the speed of travel of the vehicle a pulse generator 7 is acted on via a control input 8 by a speed signal in the manner that the pulse generator gives off a pulse defining the amount and magnitude of the change in speed to an output stage 9 and from the latter to the stepping motor 2. As a result of this process the position of the pointer is always proportional to the speed.

If the vehicle is shut off, the interruption of the voltage by the ignition lock is detected by a voltage detector 10. The voltage detector 10 feeds a reset command to a second control input 11 of the pulse generator 7. As a result, the pulse generator is caused to give off to the output stage 9 a constant number of pulses which is so great that the pointer is reset to zero even from the position of full deflection. In this connection, the stop pin 6 strikes in each case against the end of the slot 5 associated with the zero position. This pulse, however, is not given off with constant frequency but rather—since the pulse generator comprises a ramp generator—in the manner that the first pulses are produced with a pulse frequency below the start-stop frequency of the stepping motor 2 and only the subsequent pulses increase to a pulse frequency above the start-stop frequency. Thus the stepping-motor 2 starts up reliably in each case so as to be reset in each case synchronously with the number of pulses even when overcoming the moment of static friction. Only then is the speed of the resetting increased, with the desired consequence that the driving torque of the stepping motor drops so that the slot 5 of the gear wheel 4 strikes against the stop pin 6 with only a relatively slight torque of the motor. Since in most cases further pulses for the resetting are given off by the pulse generator in the zero position of the pointer, the pointer is held fast in this position, as is also desired, since the holding torque of the stepping motor is relatively slight.

The pulse frequency with which the pulses above the start-stop frequency are given off for the resetting should lie below the maximum operating frequency of the stepping motor in order to drive the stepping motor in all cases synchronously with the pulses.

I claim:

1. In an analog display device for a motor vehicle, particularly a tachometer, having a pointer which is displaceable by a reversely driven stepping motor and resettable against a stop by the stepping motor, the improvement comprising:
   a pulse generator which is controlled by a reset command and upon each reset command and upon each reset command emits a constant number of pulses to the stepping motor
   a voltage detector means for controlling said pulse generator, and wherein
   the controlled pulse generator includes means for emitting said constant number of pulses initially with a pulse frequency which is below a start-stop frequency of the stepping motor and thereafter with a pulse frequency which is above said start-stop frequency.

* * * * *